(12) United States Patent
Verschoor et al.

(10) Patent No.: US 9,086,850 B2
(45) Date of Patent: Jul. 21, 2015

(54) FLEXIBLE DISPLAY WITH DISPLAY SUPPORT

(75) Inventors: Volker Barnhart Verschoor, Eindhoven (NL); Robert Sjang Josine van Dijk, Eindhoven (NL); Michael Johannes Anna Maria Walters, Eindhoven (NL); Johannes Hermanus van den Tillaar, Eindhoven (NL); Johannes Cornelis Adriaan Hamers, Eindhoven (NL); Petrus Johannes Gerardus van Lieshout, Eindhoven (NL)

(73) Assignee: Creator Technology B.V., Breda (NL)

( * ) Notice: Subject to any disclaimer, the term of this patent is extended or adjusted under 35 U.S.C. 154(b) by 220 days.

(21) Appl. No.: 13/545,882

(22) Filed: Jul. 10, 2012
(Under 37 CFR 1.47)

(65) Prior Publication Data
US 2013/0037228 A1     Feb. 14, 2013

Related U.S. Application Data

(60) Provisional application No. 61/506,180, filed on Jul. 11, 2011.

(51) Int. Cl.
*H05K 5/00* (2006.01)
*H05K 7/00* (2006.01)
*G06F 1/16* (2006.01)
*E01F 9/012* (2006.01)

(52) U.S. Cl.
CPC ............... *G06F 1/1652* (2013.01); *E01F 9/012* (2013.01)

(58) Field of Classification Search
CPC ....................................... E01F 9/012
USPC ............... 40/610, 603; 345/1.1, 1.3
See application file for complete search history.

(56) References Cited

U.S. PATENT DOCUMENTS 8,228,667 B2 * 7/2012 Ma ........................... 361/679.01
2010/0064564 A1 * 3/2010 Bemelmans et al. ...... 40/607.01

* cited by examiner

Primary Examiner — Syed A Islam (57) ABSTRACT

A display system includes a continuous flexible display, two main display supports each structurally configured to support a respective portion of the flexible display, a segment of the flexible display being located between the said respective display portions. The two main display supports are hingeable between a closed configuration for fixing the flexible display in a storage position and an open configuration for fixing the flexible display in an open position. In the storage position between the main display supports there is a free space enabling a partial curvature of said display segment without conflicting with the respective main display support. At least one additional display support is configured to support said segment of the flexible display in the storage position and facilitates the curvature of the display segment with a predefined radius which is larger than the critical radius Rcrit for the flexible display.

10 Claims, 9 Drawing Sheets

FLEXIBLE DISPLAY WITH DISPLAY SUPPORT

This application claims the benefit of U.S. Provisional Application Ser. No. 61/506,180, filed on Jul. 11, 2011, which is hereby incorporated by reference.

TECHNICAL FIELD

The present invention generally relates to flexible displays. The present invention specifically relates to flexible displays provided with display supports.

DESCRIPTION OF RELATED ART

Flexible and especially rollable displays are manufactured on an organic substrate and are very thin. This makes it possible to repeatedly bend them with a small radius, a requirement for a rollable display. The advantages of a rollable display are the small volume needed for storing in the closed position and the lack of glass making the display unbreakable and of light weight.

A number of product concepts have been developed for flexible displays. The present invention focuses on the 'book' and the 'wrap' concept. A 'wrap' concept is shown in WO 2008/054206 A2.

The 'book' concept is the simplest implementation of a rollable display comprising two hingeably connected support halves with a continuous display. In the middle near the hinge mechanism is a hollow space to accommodate the curved segment of the display in the situation where the 'book' is in the closed position. The display size is at most twice the size of the closed display system. In practice, it will be around 1.8× the size due to the bezel of the support halves needed around the display.

The 'wrap' concept comprises a display, wrapped with its front side to a device body. Thus the display is protected when the 'wrap' is in the closed position. The display is supported with flat covers and hinge covers. The display currently makes by hinging of the covers one complete turn around the device body when wrapped. Therefore, the size of the display will be about twice the size of the device. For larger displays compared to the device body more turns are required, which adds mechanical complexity.

Figure 1A:
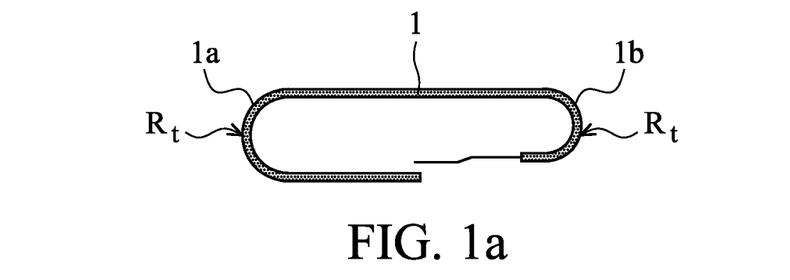
FIG. 1 shows a schematic side view of part of a 'wrap' concept in a storage position shown with a theoretical display shape (FIG. 1A) and an actual display shape (FIG. 1B), respectively.
Figure 1B:
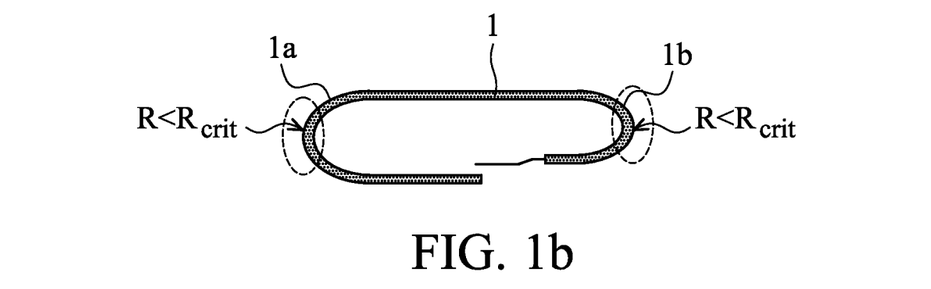
Figure 2A:
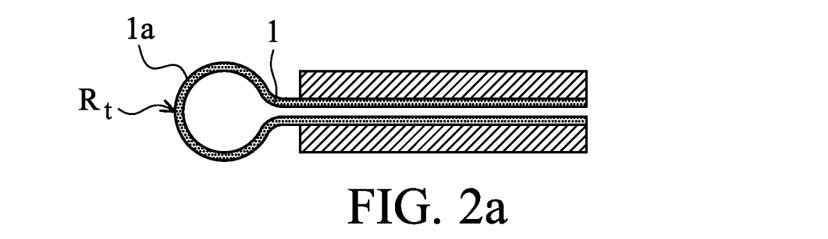
FIG. 2 shows a schematic side view of part of a 'book' concept in a storage position shown with a theoretical display shape (FIG. 2A) and an actual display shape (FIG. 2B), respectively.
Figure 2B:
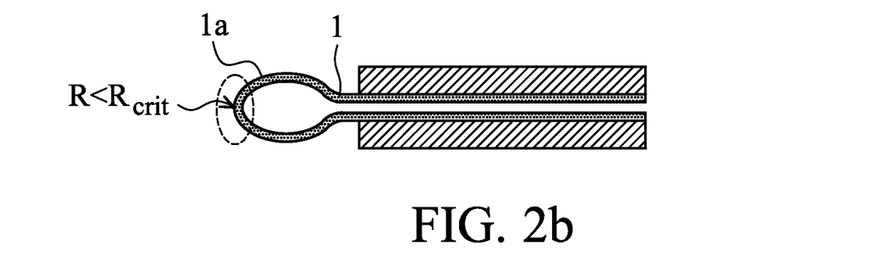

There are a lot of possibilities to realize the movement of the display with respect to the display system, but most of them result in unsupported parts of the display. In the conventional 'book' and 'wrap' concepts there are hinge areas where a segment of the display is unsupported. In FIGS. 1 and 2 for both concepts is shown the theoretical shape (FIGS. 1a and 2a) and the actual shape (FIGS. 1b and 2b) which a display 1 tends to take in the closed position. The theoretically ideal shape of display segments 1a, 1b would have a perfect circular radius $R_t$, perhaps only varying in direction (+$R_t$ or −$R_t$) but not in magnitude. However in practice in the known art the display 1 tends to take on with its segments 1a, 1b an ellipse like shape. The display 1 in a closed position as shown in FIG. 2b will encounter forces that will 'push' the segment 1a into a more elliptical shape. See the location in a circle in FIGS. 1b and 2b for the difference with FIGS. 1a and 2a respectively. These actual shapes will have a varying radius in the unsupported segments 1a, 1b which at some point(s) will be smaller than the theoretical radius and with a minimal radius at a certain point ($R_{min} < R_t$).

One reason that the display segment 1a, 1b will not take on the theoretical circular shape when in closed (rolled or wrapped) position is that the flexible display 1 is a stack consisting of a number of layers with varying mechanical properties. Another reason is that even in a mono-layer display (which is by definition impossible) internal tensions caused by the thickness and opposing forces of the material will cause a non-uniform radius in the display.

Figure 3:
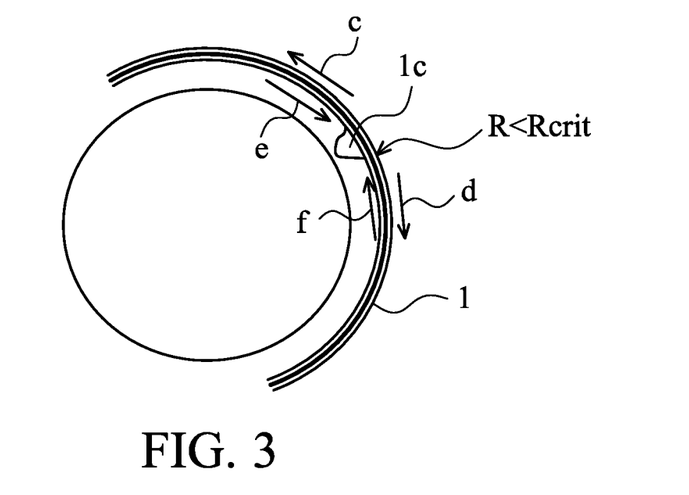
FIG. 3 shows a schematic side view of the display segment of the display shown in FIG. 1 or 2 with a local buckle in the display caused by radius smaller than the critical radius in the display.

As mentioned before this deviance from the ideal circular shape results locally in smaller radii than specified for a flexible display. Test with flexible displays in a conventional 'book' concept showed that after some time opening and closing and also after lifetime accelerating tests, buckles appeared in the display. This buckle in the flexible display causes a failure of the display. FIG. 3 shows the cross section of a flexible display 1 that has been curved to a circle. The layers of the display that are on the inside of the curve will be under compressive strain (arrows e and f) whereas the layers on the outside of the display will be under tensile strain (arrows c and d). Due to the compressive strain, the layers at the inside of the curve might form a buckle (see 1c) leading to display failure. On the other hand, the tensile strain in the layers on the outside of the curve can lead to cracks in these layers leading to display failure or a sharply reduced lifetime (in case a water barrier cracks). To avoid the above mentioned damage mechanisms, the radius with which the display can be curved must exceed a certain critical value $R_{crit}$ (which is the smallest radius at which no damage occurs). In practice the specified value will be in a range between 4 and 7.5 mm.

In practice the unsupported part of a flexible display will not generally take a circular shape. However, locally, at each point a radius can be defined (the radius of the osculating circle), which is a measure for the curvature of the flexible display at that point. The radius at each point along the display contour must exceed the critical value $R_{crit}$ to avoid damage.

It is an object of the invention to prevent a too small radius in the unsupported area of the display when the display is in the storage position. It is also an object to improve the lifetime of the display system.

SUMMARY

According to one aspect the invention provides a display system comprising a continuous flexible display, a support frame comprising two main display supports being hingeable with respect to each other and each structurally configured to support a respective portion of the flexible display, a segment of the flexible display being located between the said respective display portions, wherein the two main display supports are hingeable between a closed configuration for fixing the flexible display in a storage position and an open configuration for fixing the flexible display in an open position, in the storage position of the flexible display between the main display supports there is a free space enabling a partial curvature of said display segment without conflicting with the respective main display support and wherein at least one additional display support is configured to support substantially said segment of the flexible display in the storage position of the flexible display, the additional display support facilitates the curvature of the display segment with a predefined curvature having a radius which over the area of the curvature is larger than the critical radius $R_{crit}$ for the flexible display.

The invention focuses in the different embodiments on the support of the display segment in parts of the construction where the display segment cannot be connected to a rigid support. This can be the case near hinges, guiding mechanisms and other mechanical elements that facilitate the movement of the display and supporting frame between a closed storage and an open position. The invention provides technical solutions to constrain the display segment in order to prevent a radius which is too small and which can lead to damage during lifetime of the display system.

The advantages of the different embodiments are that the predefined curvature of the display segment in the closed position is advantageous for the lifetime of the display.

DESCRIPTION OF THE EMBODIMENTS

Figure 4A:
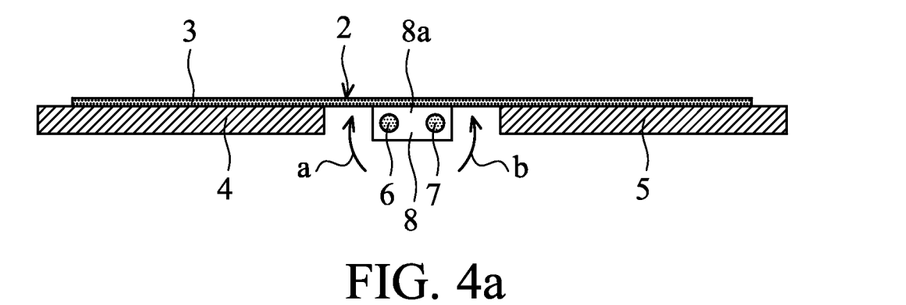
FIG. 4 shows a schematic side view of a 'book' embodiment in an open position (FIG. 4A) and a storage position (FIG. 4B), respectively, provided with an additional display support in accordance with the invention.
Figure 4B:
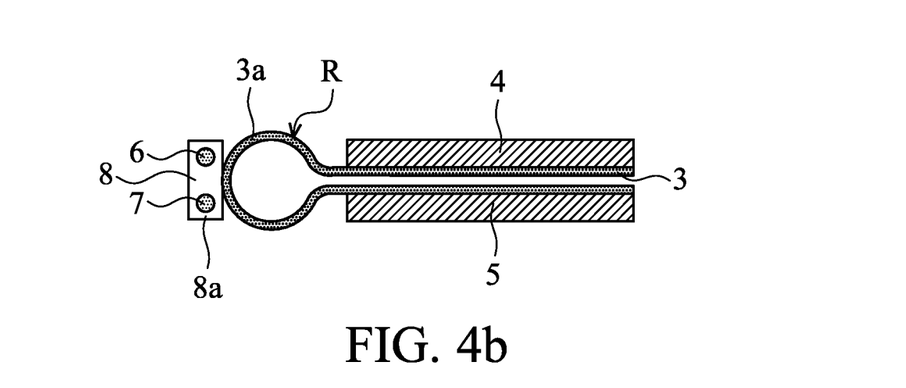
Figure 4C:
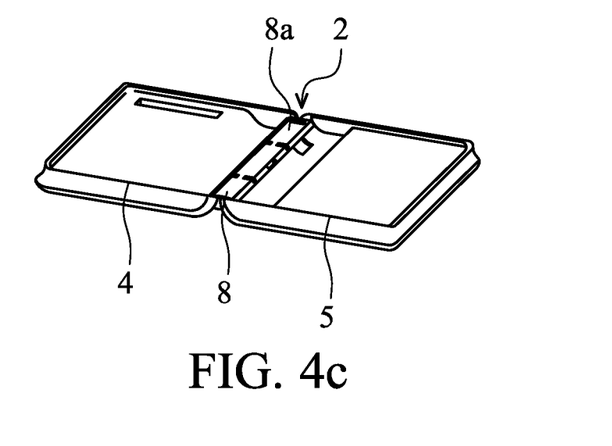
FIG. 4C shows a perspective view of this 'book' embodiment in an open position without the display but with an additional display support in accordance with the invention.

A display system 2 schematically shown in FIGS. 4A and 4B and in perspective view (but without display) in FIG. 4C is a 'book' embodiment as described by applicant's Provisional Application Ser. No. 61/506,177, filed on Jul. 11, 2011, which is hereby incorporated by reference. It comprises a flexible display 3 and a display support frame comprising two main display supports 4, 5. These supports are connected via hinges 6, 7 located in a hinge part and are each structurally config- ured to support a respective portion of the flexible display 3. The hinge part is also working as an additional display support 8. The two main display supports 4, 5 are rotatable in the direction of arrows a, b between a configuration shown in FIG. 4A for fixing the flexible display in a planar configuration to a closed storage position shown in FIG. 4B. In the open position the gap created by the hinges 6, 7 between the main supports 4, 5 is closed for a major part by the display support 8 and substantially the whole surface of the display 3, including a display segment 3a in the area between the main supports 4, 5, is supported.

In the storage position of the flexible display 3 between the main display supports 4, 5 there is sufficient free space for enabling a partial curvature of the display segment 3a without conflicting with the respective main display supports. In this position the additional display support 8 constrains with its support surface 8a the display segment 3a in order to prevent a radius of the curvature which is too small. This is achieved by placing the additional display support 8 with its support surface 8a as a "bridge" behind the display. In closed position the bridge pushes against the display, facilitates the curvature of the display segment 3a with a predefined curvature, ensures during the lifetime of the display that the radius R over the whole area of the curvature is larger than the specified minimum radius $R_{crit}$ and thus improves the lifetime of the display system. Preferably, the additional display support 8 facilitates a curvature of the unsupported display segment 3a with a radius along the display contour which is above, but close to the critical value $R_{crit}$. Since the radius is everywhere close to but above the critical value $R_{crit}$, the unsupported display segment 3a takes up close to the least possible amount of space.

Figure 4D:
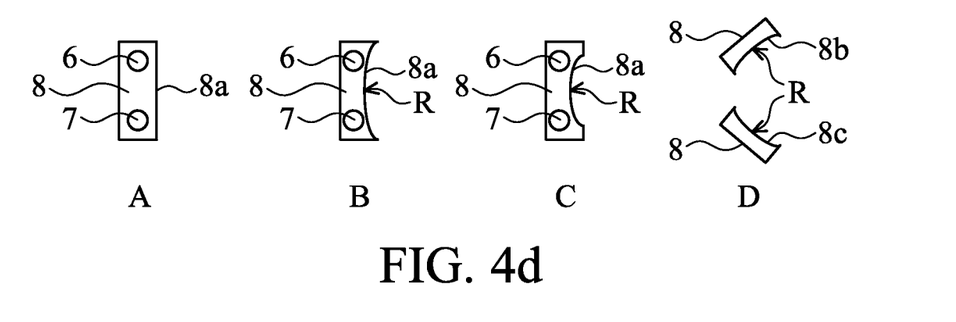
FIG. 4D shows in side view four different shapes of the additional display support.

The additional display support 8 can have its support surface 8a over either the partial, the full width or with interruptions (seen in a lateral direction to FIGS. 4A, 4B) of the display 3. Over a part of the width may be useful if electrical connections have to be guided between the both 'book' parts. If an even better approach of the theoretical radius is preferred, instead of a flat support surface 8a (FIG. 4D-A), the additional display support 8 can also have a radius R over the support surface 8a, see FIG. 4D-B. In FIG. 4D-C is shown a combination of A and B with a radius R over a central part of the support surface 8a, neighboring flat side parts of the support surface 8a. Thus the support offers sufficient place for creating holes for the hinges 6, 7. In FIG. 4D-D is shown an embodiment with a display support 8 comprising two mutually spaced parts having support surfaces 8b, 8c, respectively and both with a radius R, which parts are connected on a way not shown by hinges of the display system (for more details see the embodiment of FIG. 9).

In an experiment flexible displays were tested including an additional display support 8 for the prevention of having an ellipse shape in their display segment 3a. In these tests the displays did not have a buckle and therefore no damage to the display was caused either after some time (static storage) or after simulated dynamic lifetime experiments.

Figure 5:
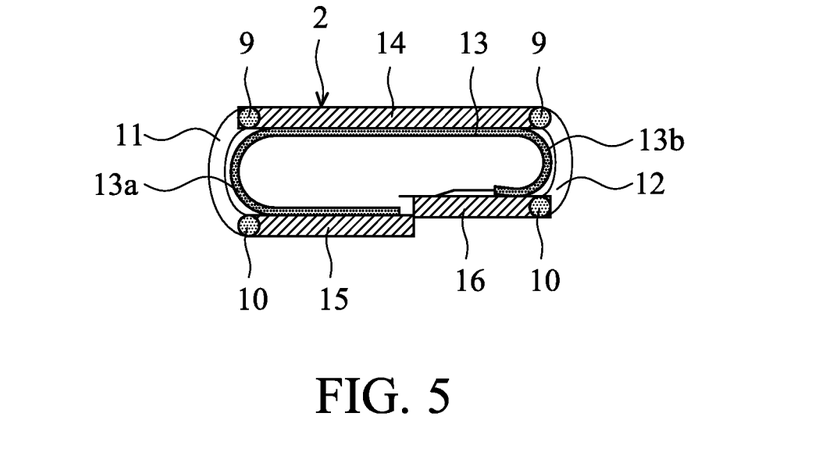
FIG. 5 shows a schematic side view of a 'wrap' embodiment in a storage position in accordance with the invention.

The embodiment shown in FIG. 5 is a 'wrap' embodiment of a display system 2 in accordance with the invention. In this embodiment two hinges 9, 10 are used for each hinge part 11, 12, connecting flat display supports 14, 15, 16 and acting as an additional display support. By means of the hinge parts display segments 13a, 13b of a display 13 the display segments will be constrained and will be prevented from having a very small $R_{min}$ as shown in FIG. 1B. The hinge parts ensure during the lifetime of the display that the radius R over the whole area of the curvature is larger than the specified minimum radius $R_{crit}$. Therefore damage to the display caused by buckling (see FIG. 3) will be prevented. It is noted that the described solution for preventing damage to the display can also be implemented for hinge parts with one or with more than two hinge shafts.

FIG. 6 shows schematically different ways of applying another type of additional display support in accordance with the invention in a 'book' or 'wrap' concept. In this solution an extra layer or component is, locally, adhered to the back of a display segment 17a of a display 17. As shown in FIG. 6 there are three embodiments: solid flexible material 18 (FIG. 6A), 'self-locking' material 19 ("watch band", type FIG. 6B) and segmented component 20 (FIG. 6C). The 'self-locking' material and segmented component solution stimulates by its configuration that in the closed position the local curvature the radius R over the whole area of the curvature is larger than the specified minimum radius $R_{crit}$. This extra layer or component is adhered to a central area of the display segment 17a most at risk of taking on an ellipse-like shape when wrapping or folding. However the application area can also be extended to all parts of the display segment 17a that will undergo bending (either positive or negative).

Figure 6A:
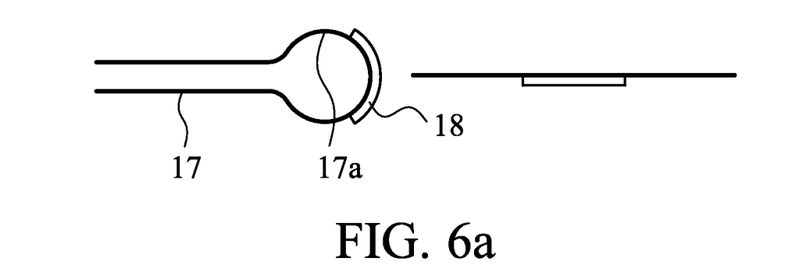
FIG. 6 shows a schematic side view of part of the display with an additional display support in accordance with the invention in a 'book' or 'wrap' embodiment in a storage position provided with an extra layer or component, in FIGS. 6A, 6B and 6C adhered to the backside of the display, in FIG. 6D applied on the front-side of the display, in accordance with the invention.
Figure 6B:
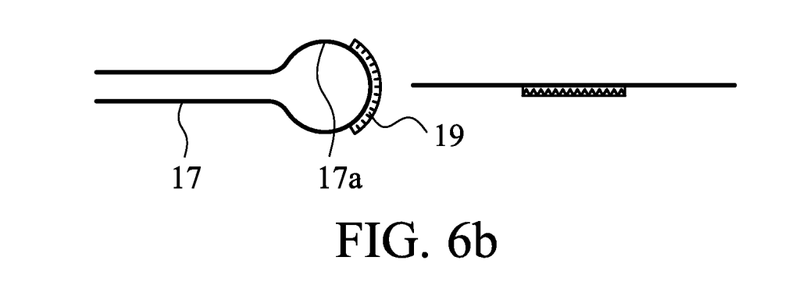
Figure 6C:
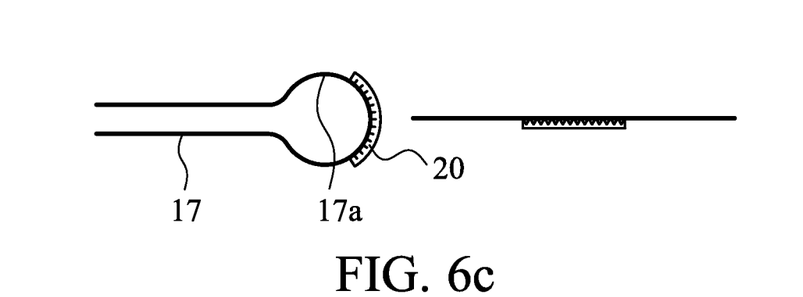
Figure 6D:
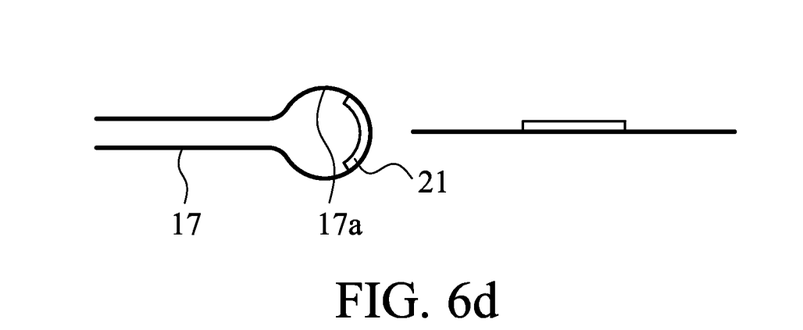

In another embodiment of this solution as shown in FIG. 6D a component or material 21 can be applied on the front of the display segment 17a; either on the "inactive" areas of the display (borders) or on the front of the display if the material itself is transparent.

It is observed that a combination of an additional display support 8 of FIG. 4 or 11, 12 of FIG. 5 and the use of a display with an extra layer 18, 19, 20 or 21 of FIG. 6 is also part of the invention.

Both the 'wrap' and 'book' embodiments work with the additional display support on the principle of locally preventing the display of having a too small radius<$R_{crit}$ at a particular location, shown in FIG. 1b, 2b. This location is a point in the curved shape of the display segment (see FIG. 5), or line in the width of the display (see FIG. 4b).

Figure 7A:
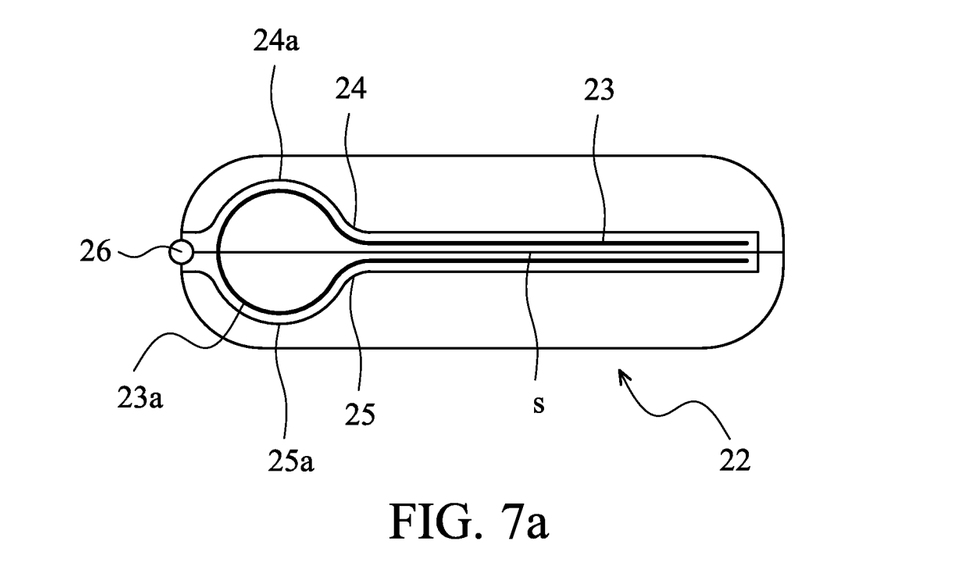
FIG. 7 shows a schematic side view of another 'book' embodiment in a storage position with display supports with one and two hinges respectively in a symmetrical (FIG. 7A) and an asymmetrical (FIG. 7B) version in accordance with the invention.
Figure 7B:
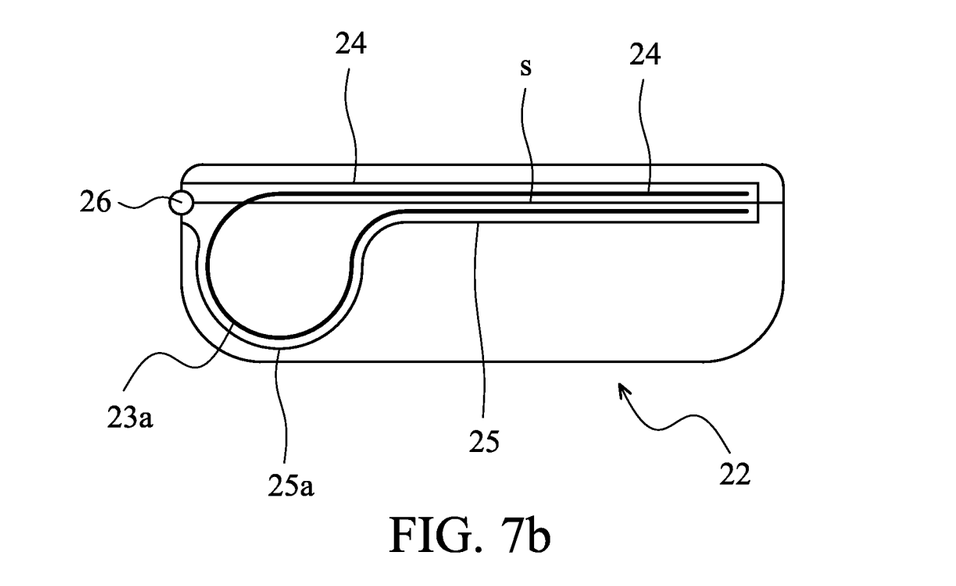

However it is also possible to fully constrain the display with the ideal closed shape of the display at the hinge area, see FIG. 7a, 7b for 'book' embodiments with such an ideal closed shape. The embodiment of FIG. 7A is a symmetrical version of such a 'book' type display system 22 in accordance with the invention with equally shaped housings of display support panels and in the storage position a display 23 with its display segment 23a symmetrically curved with respect to a plane s between display supports 24, 25 and their housings. These two display supports with their integral local curvature at the location of an additional display support 24a, 25a fully constrain the display segment 23a with the ideal closed shape of the display adjacent to the location of a hinge 26.

In FIG. 7B the display support housings have different dimensions measured perpendicular to the plane s between both display support housings. In the closed position the display segment 23a is curved only into the housing of the display support 25. Thus the support 25 with its integral local curvature at the location of an additional display support 25a fully constrains the display segment 23a with the ideal closed shape of the display adjacent to the location of a hinge 26. This solution can be applied in asymmetrical 'book' systems, in which the display segment 23a is asymmetrically curved with respect to the plane s between both display supports 24, 25 and their housings.

The embodiments of FIG. 7A, 7B allow the display 23 at the location of the display segment 23a to approach the theoretical radius $R_t$ (see FIG. 2a) by providing the additional display supports 24a, 25a with an inner radius which approaches or equals the preferred theoretical radius.

Figure 8A:
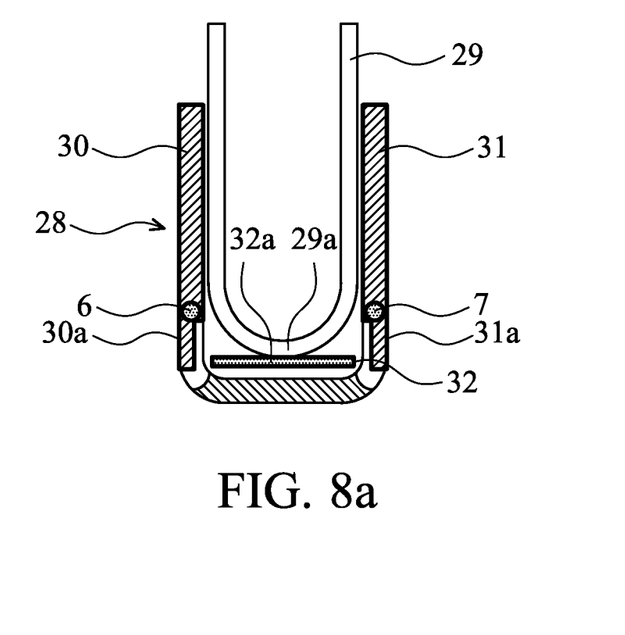
FIG. 8 shows a schematic side view of a part of another 'book' embodiment in a storage position (FIG. 8A), and open position (FIG. 8B), respectively, in accordance with the invention.
Figure 8B:
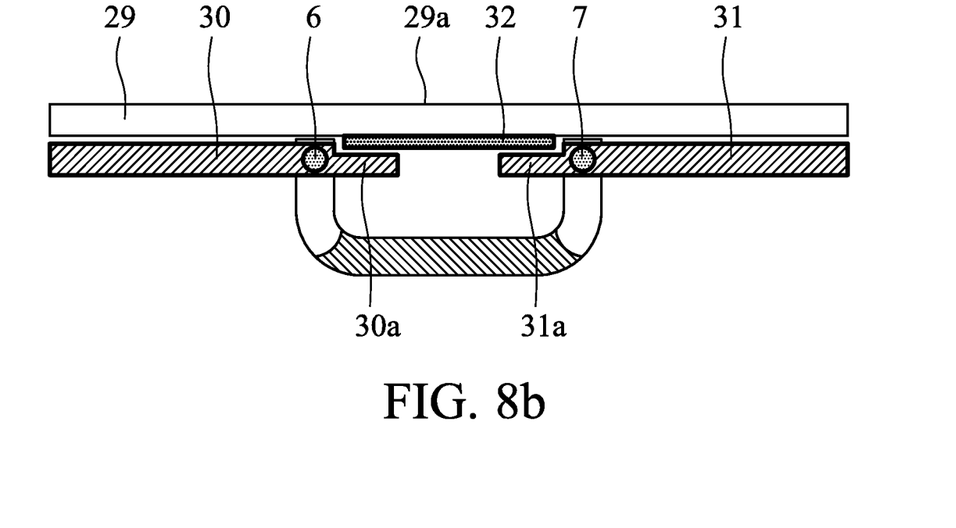

The embodiment shown in FIG. 8 is a 'book' or 'wrap' display system 28 with a flexible display 29, a display segment 29a and main display supports 30, 31. These main supports are hingeable connected via hinges 6, 7 like the supports 4, 5 in the embodiment of FIG. 4. In this embodiment the additional display support comprises a support strip 32 which is connected to a central part of the display segment 29a and which working is comparable with the additional display support 8 of FIG. 4. The main display supports 30, 31 are provided with hooks 30a, 31a and push with the hooks during their movement from the storage position of FIG. 8A to the open position of FIG. 8B the support strip 32 with the display segment 29a to the flat position. In the open position the gap created by the hinge mechanism of hinges 6, 7 between the main supports 30, 31 is closed by the display support strip 32 and substantially the whole surface of the display is supported. In the closed position the support strip 32 facilitates by positioning its support surface 32a against the display segment 29a a predefined curvature of the display segment 29 in a way as described before for the embodiment of FIG. 4. ensuring that the radius R over the whole area of the curvature is larger than the specified minimum radius $R_{crit}$. Like the additional display support 8 the support strip 32 can have its support surface 32a over either the partial or the full width (lateral direction to FIGS. 8A, 8B) of the display 29. Instead of a flat support surface 32a (FIG. 4D-A), the support strip 32 can also have a radius R over the support surface 32a, like in FIG. 4D-B or in FIG. 4D-C.

Figure 9A:
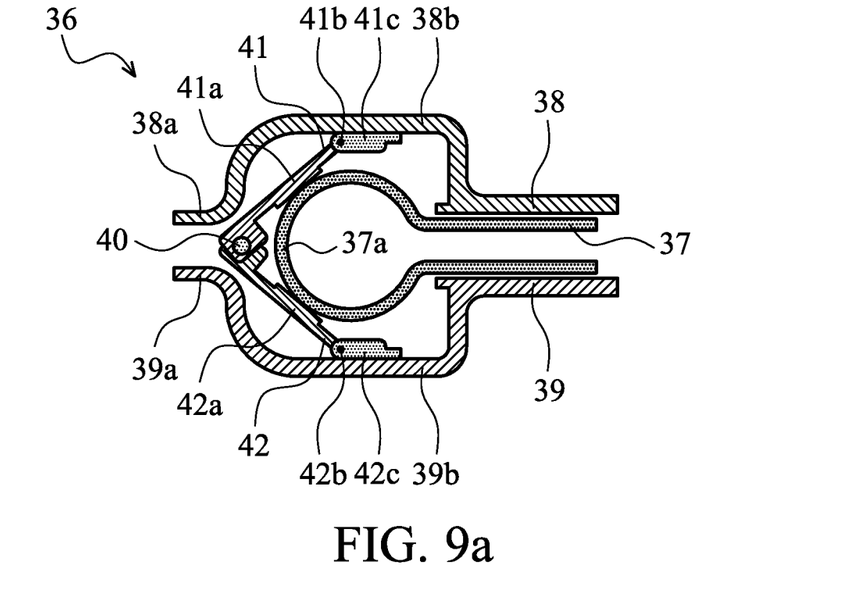
FIG. 9 shows a schematic side view of another 'book' embodiment in a storage position (FIG. 9A), a partial open position (FIG. 9B) and open position (FIG. 9C), respectively, in accordance with the invention.
Figure 9B:
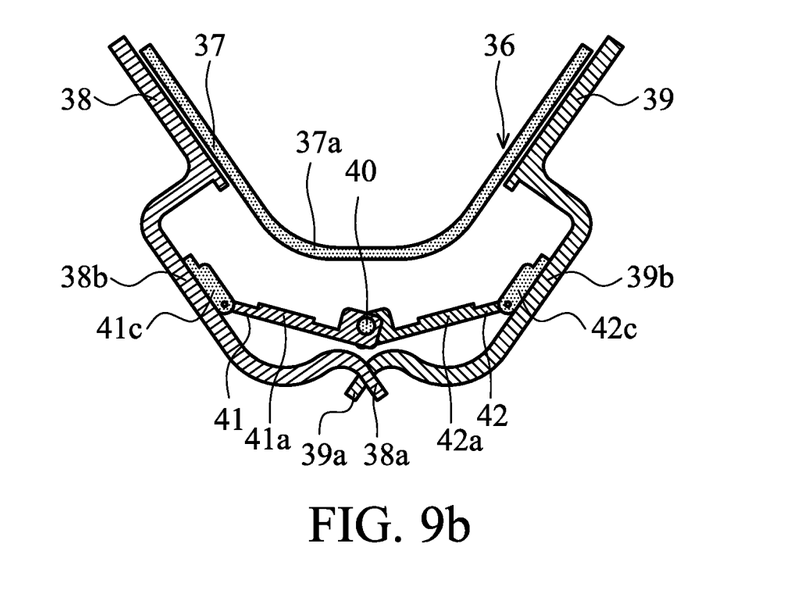
Figure 9C:
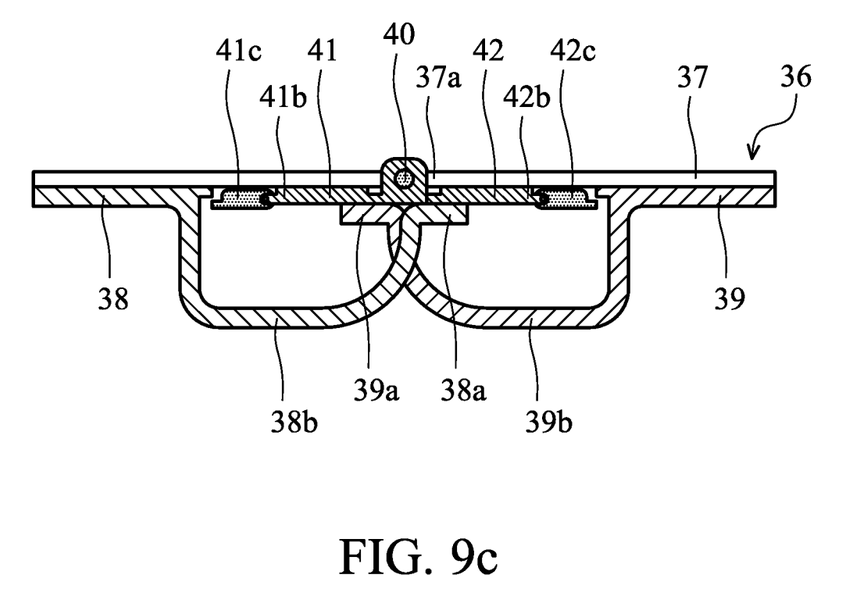

In the embodiment shown in FIG. 9 a display system 36 with a display 37 has main display supports 38, 39 with housing parts 38b, 39b and extended parts 38a, 39a. Two flat panels 41, 42, rotatably connected around an axis 40, in FIG. 9A in the closed state shown inside the housing parts 38b, 39b, are configured as an additional display support. The flexible display 37 has free space between the housing parts 38b, 39b to form with its display segment 37a a predefined curvature, facilitated by support portions 41a, 42a of the panels 41, 42. These portions 41a, 42a are symmetrically arranged with respect to the curvature of the segment 37a and to a plane between the supports 38, 39 comprising the axis 40. By pivots 41b, 42b the panels 41, 42 are connected with panel parts 41c, 42c. For ensuring stable end positions this connection may be spring loaded. Upon opening the two main displays supports 38, 39 with the extended parts 38a, 39a push and support the supporting flat panels 41, 42 via the position as shown in FIG. 9B. towards the open position as shown in FIG. 9C. Between the two flat panels 41, 42 the angle of rotation can be limited so that in open state the panels 41, 42 and their parts 41c, 42c are parallel, therefore support the flexible display segment 37a in the region of the hinge mechanism and ensure that the radius R over the whole area of the curvature is larger than the specified minimum radius $R_{crit}$. Reference is made to FIG. 4, especially the supports 8 in FIG. 4D-D, alternatively, the support portions 41a, 42a may have curved surfaces like the surfaces 8b, 8c.

Figure 10A:
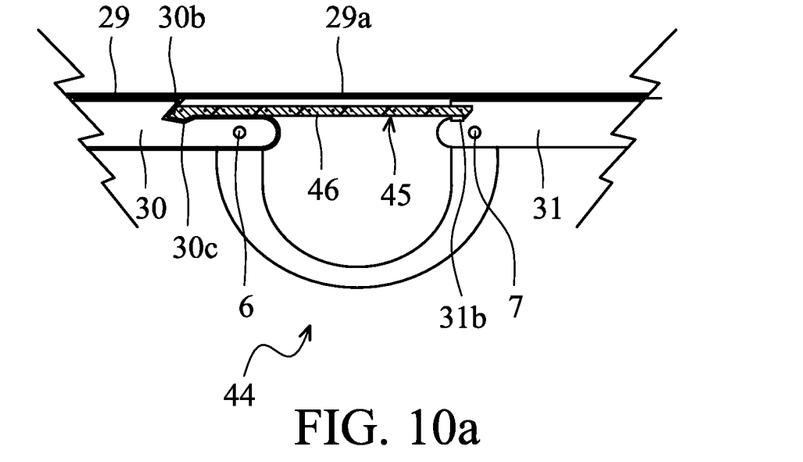
FIG. 10 shows a schematic side view of a part of still another 'book' or 'wrap' embodiment in a storage position (FIG. 10A) and open position (FIG. 10B), as well as the positioning of the additional display support (FIG. 10C), respectively, in accordance with the invention.
Figure 10B:
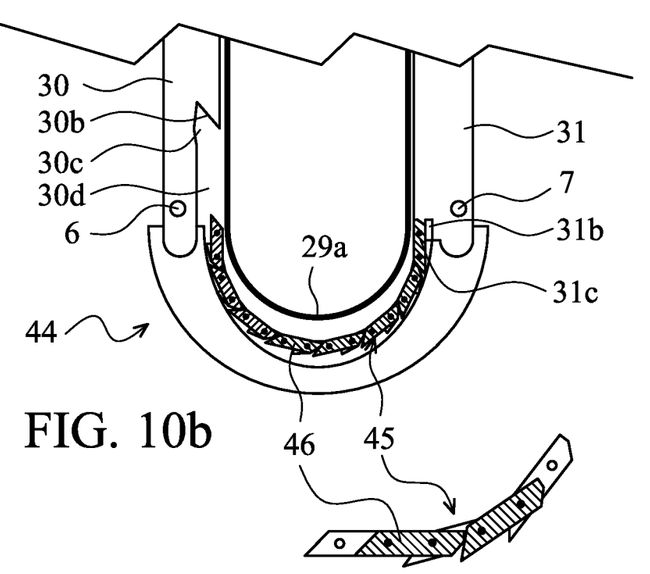
Figure 10C:
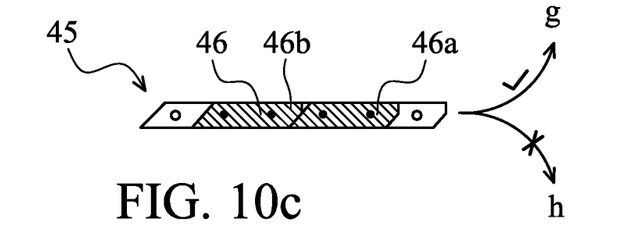

An alternative solution in a display system 44 for an additional display support 45 for the preceding 'book' or 'wrap' embodiments such as FIG. 8 is shown in FIG. 10 in an open flat position (FIG. 10A) and in a storage position (FIG. 10B), respectively. This solution uses a number of specially designed, by hinges 46a interlinked segments 46. An end segment 46 is coupled by a pivot 31c with the display support 31 and an abutment 31b limits the pivotal movement of this end segment. These segments are substantially parallelogram-shaped with one rounded corner 46b and are mutually configured such that when a segment 46 is locally bent to a radius, its interlinkage will make sure that other segments follow (see arrow g in FIG. 10C). The segments 46 ensure that the local radius R of the curvature of the display segment 29a along the display contour is larger than the specified minimum radius $R_{crit}$. The configuration and interlinkage of the segments prevent that a segment 46 is bent in the direction of the arrow h in FIG. 10C. During the movement from the position shown in FIG. 10B to the to the flat position shown in FIG. 10A all segments 46 are pushed flat by their configuration and interlinkage. A stable positioning towards the flat position of the segments is supported due to the length of the gap 30d between the display and the support 30. In addition, in the position shown in FIG. 10B at the left side of the gap 30d an end segment 46 may be stable positioned in an optional hook shaped recess 30b in the support 30. Further in addition, in the area of the gap 30d an optional recess 30c in the support may be applied for extra stabilizing the flat position of the segments 46. Due to this stable positioning the flat position of the whole additional support 45 is ensured. In the flat position the combined segments 46 support substantially the whole surface of the display segment 2a in an effective way. It is noted that in addition a spring (not shown) may be applied between the left side segment 46 and the support 30, urging the end segment 46 into the gap 30d towards its end position The minimum achievable radius of the curvature will be determined by the positioning of the individual hinges 46a, the design of end stops near the corners of the segments and the distance between hinge points. This enables in the storage position a facilitation of the curvature of the display segment 29a with a predefined curvature, in this embodiment shown as a combination of circular arches.

A special advantage of the invention is the dual function of the additional display support, in the open position of the display system as a display touch support and in the closed position as a display curvature facilitator.

The detailed drawings, specific examples and particular formulations given, serve the purpose of illustration only. Furthermore, other substitutions, modifications, changes, and omissions may be made in the design, operating conditions, and arrangement of the exemplary embodiments without departing from the scope of the invention as expressed in the appended claims.

The invention claimed is:

1. A display system comprising:
    a continuous flexible display;
    a support frame comprising two main display supports being hingeable with respect to each other and each structurally configured to support a respective portion of the flexible display, a segment of the flexible display being located between the said respective display portions, wherein the two main display supports are hingeable between a closed configuration for fixing the flexible display in a storage position and an open configuration for fixing the flexible display in an open position, and wherein in the storage position of the flexible display between the main display supports there is a free space enabling a partial curvature of said display segment without conflicting with the respective main display support; and
    at least one additional display support arranged to physically contact and support said segment of the flexible display in the storage position of the flexible display, and to physically contact said segment of the flexible display in the open position of the flexible display;
    wherein the two main display supports are hinged to the additional display support,
    wherein, in the storage position of the flexible display, the additional display support facilitates the curvature of the display segment with a predefined curvature having a radius which over the area of the curvature is larger than the critical radius for the flexible display.

2. The display system of claim 1, wherein in the storage position of the flexible display, the additional display support facilitates the curvature of the display segment in a combination of circular arches.

3. The display system of claim 1, wherein in the storage position of the flexible display, the additional display support facilitates a curvature of the unsupported display segment with a radius along the display contour which is above, but close to the critical value.

4. The display system of claim 1, wherein at least one additional display support has a substantially flat support surface.

5. The display system of claim 1, wherein the at least one additional display support comprises a curved support surface.

6. The display system of claim 5, wherein the support surface has a curvature with a radius which approaches or equals the predefined radius of the display segment.

7. The display system of claim 1, wherein in the storage position said display segment is supported by two mutually spaced additional display supports being symmetrically arranged with respect to the curvature of the display segment.

8. The display system of claim 1, wherein the additional display support is located both in the open position and storage position of the display at the backside of the display segment, supporting in the open position the display segment as a touch support, and facilitating in the storage position of the display the curvature of the display segment with a predefined curvature.

9. The display system of claim 1, wherein in the storage position of the display the additional display support supports over the whole width of the display segment.

10. The display system of claim 1, wherein in the storage position of the display the additional display support supports over part of the width of the display segment.

* * * * *